A. W. WESSOLECK.
SPEEDOMETER DRIVING PINION SUPPORT.
APPLICATION FILED JAN. 24, 1913.
1,058,930.
Patented Apr. 15, 1913.
2 SHEETS—SHEET 1.
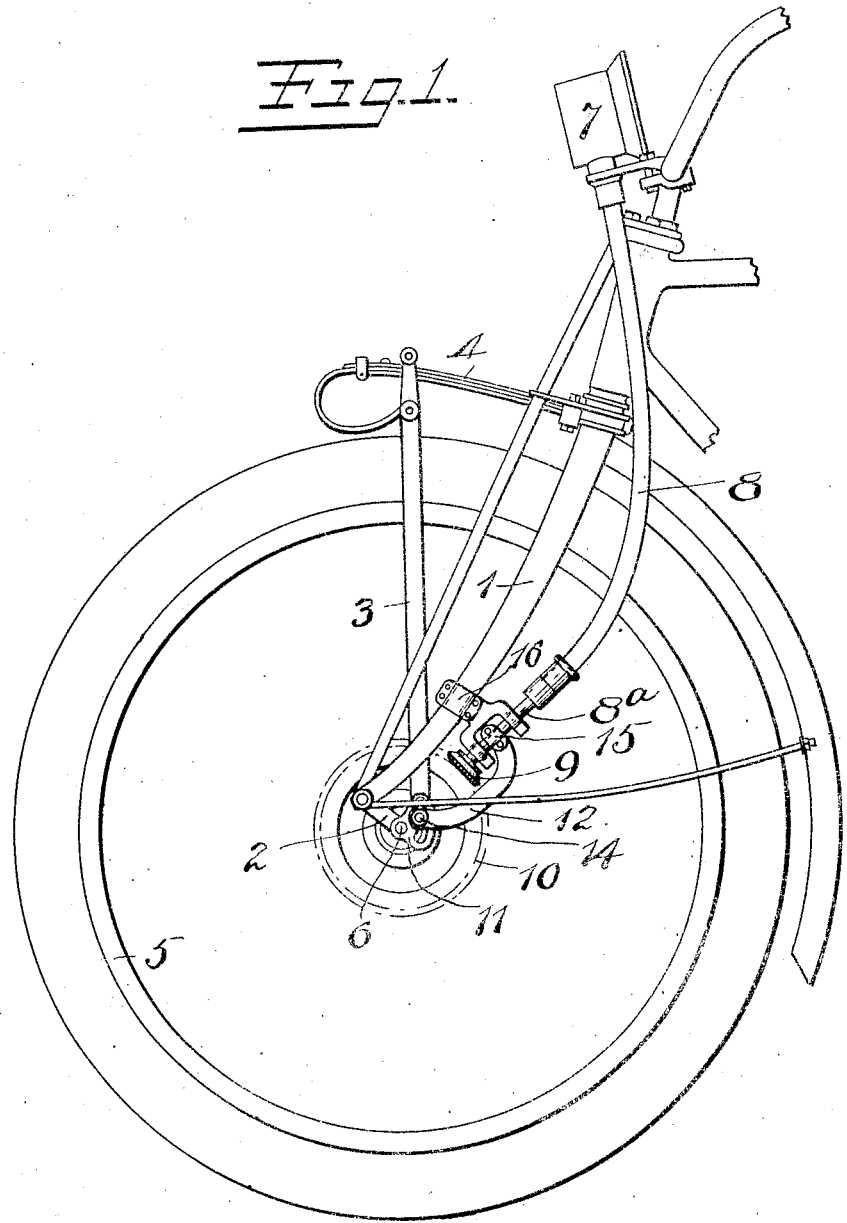

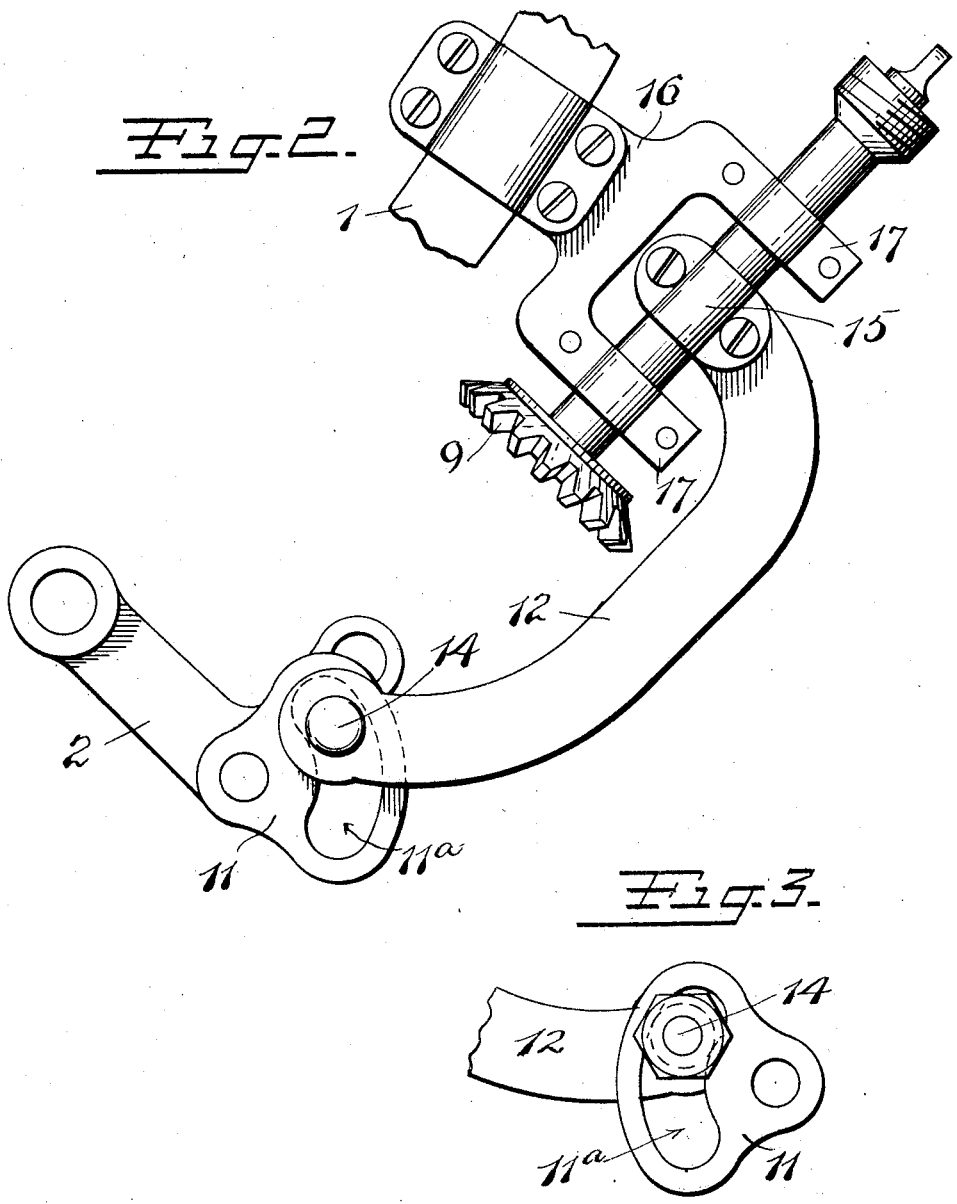

UNITED STATES PATENT OFFICE.

AUGUSTUS W. WESSOLECK, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

SPEEDOMETER-DRIVING-PINION SUPPORT.

1,058,930.

Specification of Letters Patent.

Patented Apr. 15, 1913.

Application filed January 24, 1913. Serial No. 743,978.

*To all whom it may concern:*

Be it known that I, AUGUSTUS W. WESSOLECK, a citizen of the United States, residing at New Britain, Hartford county, State of Connecticut, have invented certain new and useful Improvements in Speedometer-Driving-Pinion Supports, of which the following is a full, clear, and exact description.

My invention relates to an improved support for a speedometer driving pinion to be associated with a driving gear mounted upon a yielding wheel, the purpose being to keep the driving gear and driving pinion in proper mesh as the wheel moves up and down relatively to the body or frame of the vehicle. In all such devices, the one aim is to secure a concentric relation of the driving pinion relatively to the front wheel, and the present invention relates to one particular means for accomplishing that result.

The invention is of particular utility in connection with bicycles in which the front wheel is mounted in so-called spring fork.

In the drawings, Figure 1 is a side elevation of the front part of a bicycle equipped with my invention. Fig. 2 is a relatively enlarged detail view. Fig. 3 is a view of the reverse side of parts shown in Fig. 2.

1 represents the rigid part of the front fork of a bicycle.

2 represents the oscillating part thereof usually in the form of a bracket pivoted at the lower end of the rigid part 1. This oscillating bracket has at its free end a connection with an upright 3 which in turn is connected to a spring 4 carried by the head of the fork 1. The wheel 5 is connected by an axle 6 in the usual manner with the bracket 2 at a point between its ends, hence as the wheel encounters obstructions, it may move up and down, oscillating the bracket 2 and lifting the rod 3 against the cushioning action of the spring 4.

7 represents conventionally a speedometer suitably mounted on the vehicle for convenient inspection.

8 represents the casing of a flexible shaft, the core of which is revolved by means of a driving pinion 9 which in turn is driven by a driving gear 10 carried by the wheel 5 concentric with the axis thereof. The driving pinion 9 is suitably mounted for rotation in a sleeve 8ª which is held positioned in the manner hereinafter described relatively to the axis of rotation of the wheel 5 so that said driving pinion 9 will always mesh properly with the driving gear 10.

11 is a plate having therein a concentric slot 11ª.

12 is a gooseneck arm which has at one end a pivot or stud 14 which slides freely in the slot 11ª. The other end of the gooseneck arm has a clamp 15 which is adjustably secured to the sleeve 8ª.

16 is a bracket arranged to be clamped to the fork 1 and having one or more guide arms 17 which freely engage the sleeve 8ª so that the latter may slide easily up and down relatively thereto.

To assemble the parts, the plate 11 is slipped over the end of the axle 6 and securely clamped in place by the end nut. The slot should stand approximately as shown in Fig. 2. The guide bracket 16 is then applied and the front fork 1 at the proper position. The goose-neck arm 12 should be properly connected with the sleeve 8ª so that the pinion will properly mesh with the driving gear. If the driving pinion 9 does not mesh properly with the driving gear 10, the clamp 15 is loosened and the sleeve 8ª is shifted therein to that degree necessary to secure the proper adjustment, whereupon the clamp 15 is again tightened up. The parts are then ready for use.

In operation, it is manifest that the gear 9 will always be held at a definite spaced relation to the axis of the front wheel 1 by reason of the goose-neck arm 12, which holds the sleeve 8ª. This goose-neck arm 12 cannot partake of any longitudinal movement relatively to the radius of the driving gear because one end of said arm is always held concentrically by the concentric slot 11ª. The slot 11ª is provided to permit the wheel 5 to move up and down to secure the cushioning effect. As the wheel moves up and down relatively to the rigid fork 1, it is obvious that the sleeve 8ª may slide up and down in the guide bracket 16. The main function of the guide bracket 16 is to hold the parts against side strain occasioned by the pressure of the gear 10 outwardly against the pinion 9, the gears being preferably of the beveled type, although the particular form of such gears is immaterial to the present invention.

What I claim is:

1. A speedometer driving-pinion support for use in connection with yieldingly mounted wheels comprising a rigid fork, a wheel yieldingly mounted thereon to move up and down relatively thereto, an axle for said wheel, a plate rigidly carried by said axle, said plate having a concentric slot, a driving gear carried by the wheel concentrically, a driving pinion with a goose-neck arm having a bearing at one end freely movable in the slot of said plate, with means at the other end for supporting the pinion, and guide means for said pinion arranged to be carried by said rigid fork.

2. A speedometer driving-pinion support for use in connection with yieldingly mounted wheels comprising a rigid fork, a wheel yieldingly mounted thereon to move up and down relatively thereto, an axle for said wheel, a plate having a concentric slot rigidly carried by said axle, a driving gear concentrically carried by the wheel, a driving pinion having a sleeve-like bearing, a goose-neck arm clamped to the bearing at one end and a slidable connection between the other end of said goose-neck arm and said slotted plate, with means for engaging the other end of said arm with said sleeve-like bearing to hold said bearing at a fixed spacing relatively to the axis of the wheel, and a guide means for said sleeve-like bearing, said guide means being carried by said fork.

AUGUSTUS W. WESSOLECK.

Witnesses:
HERBERT BROWNE,
R. L. GRANT.